Figure 1:
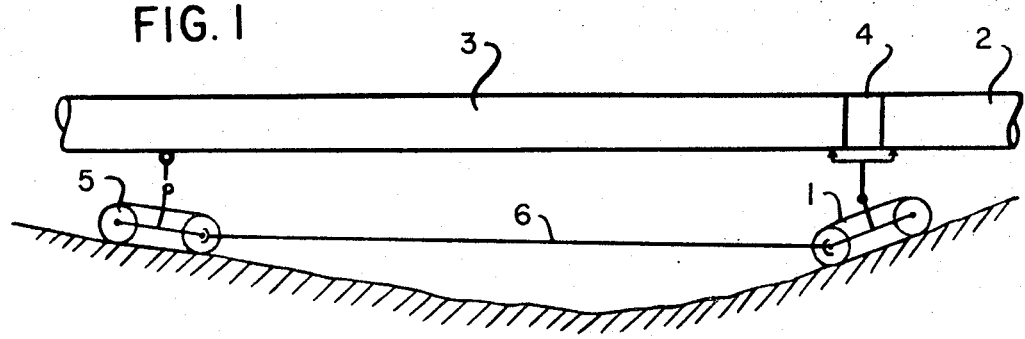

United States Patent [19]
Paolini

[11] 3,745,641
[45] July 17, 1973

[54] METHOD AND APPARATUS FOR JOINING TWO ELEMENTS MADE OF METAL OR THERMOPLASTIC MATERIAL

[76] Inventor: Laurent L. Paolini, Residence Eugenie, 92 St.Cloud, France

[22] Filed: May 28, 1971

[21] Appl. No.: 148,090

[30] Foreign Application Priority Data
June 5, 1970 France .................... 7020675

[52] U.S. Cl. ............... 29/470.3, 156/73, 228/2
[51] Int. Cl. ............................... B23k 27/00
[58] Field of Search .............. 228/2; 29/470.3; 156/73, 480

[56] References Cited
UNITED STATES PATENTS

| | | | |
|---|---|---|---|
| 3,388,849 | 6/1968 | Blum et al. | 29/470.3 |
| 3,234,646 | 2/1966 | Hollander et al. | 29/470.3 |
| 3,002,871 | 10/1961 | Tramm et al. | 228/2 X |

Primary Examiner—Robert D. Baldwin
Assistant Examiner—Robert J. Craig
Attorney—McDougall, Hesh & Scott

[57] ABSTRACT

A method of joining by friction two elements of metal or thermoplastic material in which the elements are maintained immobile in axially aligned spaced relation and an intermediate member is inserted therebetween for rotational movement while in pressure contact with the ends of the tubular members to be joined and the surfaces are softened by frction after which rotational movement of the intermediate member is stopped while maintaining pressure contact until the weld sets.

10 Claims, 2 Drawing Figures

PATENTED JUL 17 1973 3,745,641

INVENTOR.
LAURENT L. PAOLINI
BY
M'Dougall, Hersh - Scott ATTYS

METHOD AND APPARATUS FOR JOINING TWO ELEMENTS MADE OF METAL OR THERMOPLASTIC MATERIAL

This invention relates to welded tubular elements, and it relates more particularly to elements of great length which are sought to be welded one to the other or to various connecting members in which the tubular elements are formed of materials such as metal or thermoplastic.

The invention is applicable particularly to the construction of a piping system of large diameter, such as for oil or gas pipe lines or electrical or communication conduits.

Such pipe systems are currently made of tubular elements which are joined, as by "on site" welding. In order to reduce the number of welds, the tubular elements are generally of substantial length, such as 10 meters or more. The welds are usually made with a welding torch or by arc welding. The performance of these welding methods often give rise to problems which are difficult to overcome by reason of the fact that such methods are usually carried out manually on site; require the addition of material differing in composition from that of the tubes, and each weld must be subjected to careful examination.

In order to overcome these difficulties, the proposal has been made that tubular elements be welded together by rotating one element against the remainder of the previously assembled pipe system maintained in a fixed position. The rotation is carried out under sufficient pressure to produce friction between the parts to be welded. This friction is continued until the softening, due to temperature rise of the parts to be joined, is sufficient for the parts to weld together. Rotation of the tubular element is then terminated while pressure is maintained until the weld has solidified.

Although this latter method provides an interesting solution for fabricating pipe systems of considerable length, it nevertheless suffers from a number of disadvantages. It requires rotation of the tubular element to be welded, which, because of the length of the element, involves the use of bulky on site machinery which may be difficult to adapt to uneven surfaces of the ground on which it rests, since this method does not permit tubular members to be properly joined unless the axes are perfectly aligned. Moreover, rotation of tubular elements of the type described requires a considerable aamount of energy.

It is an object of this invention to provide a method for welding tubular elements of great lengths which maintain the advantages of friction welding while overcoming the abovementioned disadvantages.

Figure 2:
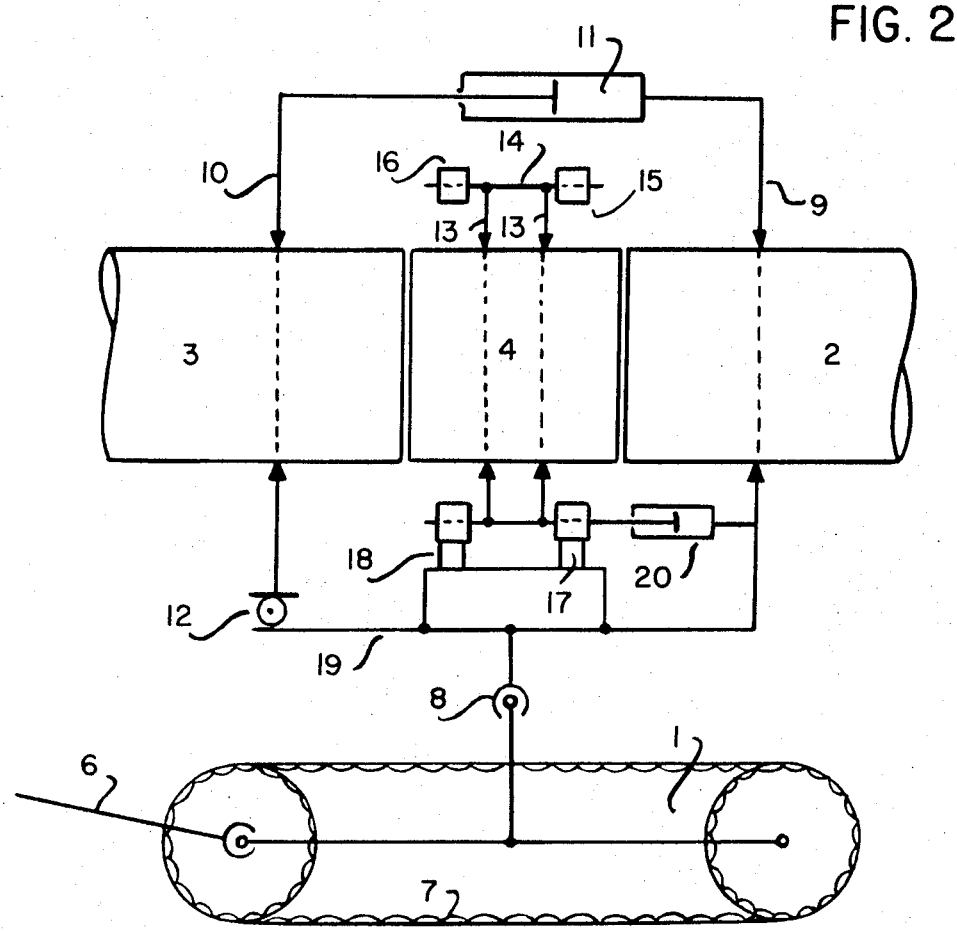

These and other objects and advantages of this invention will hereinafter appear and for purposes of illustration, but not of limitation, reference is made to the accompanying drawings in which FIG. 1 is a schematic elevational view of the apparatus employed in the practice of this invention; and FIG. 2 is an elevational view showing the arrangement of parts for the joinder of tubular elements of considerable length.

Breifly described, the invention comprises a method which makes use of friction for joining two elements of metal or thermoplastic material. The method comprises maintaining the elements substantially immobile relative to each other with the surfaces to be joined facing each other, placing between said surfaces an intermediate member such that the end surfaces to be joined are each in contact with the opposite ends of the intermediate member, rotating the intermediate member while bringing the elements to be joined in the direction towards each other until the surfaces in contact with the rotating member are caused to soften by friction, continuously adjusting the position of the intermediate member along an axis perpendicular to the surfaces to be welded, and finally stopping the rotation of the intermediate member, while maintaining pressure on the parts to be joined, until the weld sets.

The method of the invention is especially applicable to the joinder of tubular elements of considerable length which may be formed of metal such as iron, copper, aluminum, or alloys of such metals, or of plastic material such as polyethylene, polyvinyl chloride and the like. Although the method of the invention can be applied to the welding of materials of different compositions, provided they are compatible with respect to thermal welding, it is of particular interest when the elements to be welded and the intermediate members are of the same compositions, in which event the joining operation enjoys all of the advantages of autogenous welds.

In one embodiment of the invention, the elements are joined by means of an intermediate member which simply comprises a short section of a tubular member having the same diameter as the tubular elements and having a thickness which is equal to or greater than the thickness of the elements to be joined. This intermediate member can also be a circular collar or two collars which are pre-assembled by bolting and which are separated by a joinder. In the latter case, the assembly formed can be dismantled.

The intermediate member is rotated about an axis which, when joining aligned tubes, is identical with the axis of the tubes. The rotation can be continuous in one direction or reciprocating. The rotational movement can be effected simply by mechanical means, such as, for example, a drive rim which is locked onto the intermediate member with the drive rim itself being operative mechanically by a gear drive, chain drive, drive belt or other means. The elements to be joined are brought together by locking one of the two elements and applying axial force to the other, such as by means of a ram. The axial force is thus transmitted from the one member to the intermediate member and through the intermediate member to the other member to be joined. When joining a pipe system of great length, the portion of the pipe system which has already been joined together is held in fixed position and the axial force is applied to the tubular element to be welded onto the previously joined pipe system. It is desirable to be able to modify the position of the intermediate member along an axis perpendicular to the surface to be welded so as to achieve the optimum welding conditions on both ends of the intermediate member. This can be achieved by means of a differential axial force which can be applied, for example, by means of a system of additional double acting rams which move the intermediate member towards or away from the fixed tubular element.

It is important that the elements to be joined be progressively brought together in order to avoid tearing of the surfaces of the material to be welded and in order to reduce the power consumption of the welding operation. A preferred method of carrying out the invention comprises rotating the intermediate member first without applying any axial force. Thereafter, when the intermediate member reaches its normal speed of rotation, the operation for bringing the elements together is initiated, preferably without the generation of sparks.

When the desired degree of softening is reached, as indicated by the appearance of a small collar of softened material around the surfaces to be joined, rotation of the intermediate member is terminated but the axial force is maintained to maintain pressure against the part to be joined until the weld has solidified.

The complete operation, including adjusting the position of the intermediate member, is preferably achieved by means of a control apparatus which is responsive to the temperature and the flow rate of the weldings and which acts, for example, on the rams.

The method of this invention is especially adapted to the welding of pipe systems in a straight line but it can also be used for joining tubular elements which are arranged at an angle one to the other. Thus, when joining two pipe elements having the shape of cylinders of revolution and aligned at an angle to each other, the surfaces to be joined, which must be parallel, are of elliptical shape. The intermediate member, which can be a tube portion or a circular collar, is formed with an internal diameter which is at most equal to that of the cylinders of revolution, whereas the external diameter of the intermediate member is at least equal to that of the major axis of the ellipse.

In such instance, it is possible to rotate the intermediate member between the surfaces to be joined while maintaining contact at all points between the surfaces to be joined.

Other embodiments of the method of the invention can also be employed. It is possible, for example, to join two pipe elements of different diameters by means of an intermediate member which is of a shape and thickness sufficient to bear against the whole of the surfaces to be joined together.

The method can also be employed for fixing a pipe to a solid flange, a valve or a T-shaped conduit, for example.

Referring now to the drawings, illustration will be made with reference to the joinder of elongate steel pipes on the ground. The complete joining apparatus, illustrated in FIG. 1, comprises a driving carriage 1 supporting the part 2 of the pipe system which has already been joined, the pipe element 3 to be added, and a tube portion 4 acting as an intermediate member. The pipe element 3 is also carried by the support carriage 5 which is connected to the drive carriage 1 by a reaction bar 6. The carriage 5, which has a control device not shown, serves solely to keep the intermediate pipe element 4 aligned.

The driving carriage, illustrated in detail in FIG. 2, comprises a mobile system 7 of wheels and caterpillar tracks which enable the carriage to be moved over the ground and a mechanical device mounted on a pivot 8. The mechanical device comprises a system for locking the adjacent ends of pipes 2 and 3 in aligned position, such mechanical device being diqgrammatically illustrated as jaws 9 and 10. The pressure on the surfaces to be welded is provided by a ram 11 which connects the jaws 9 and 10. A pivot 12 permits the jaws 9 and 10 to be moved axially in the direction toward and away from each other.

Fixed to the intermediate member 4, by means of jaws 13, is a drive ring 14 having two pulleys 15 and 16 which are rotationally supported on rolling bands 17 and 18 fixed onto a frame 19 which is rigid with the jaws 9 and 10. In this way, the intermediate member 4 is maintained in axial alignment with the pipe elements 2 and 3 to be joined. The intermediate member 4 is rotated by way of the drive ring 14 by means of a conventional motor drive system which is not shown.

A differential axial force can be applied to the intermediate member 4 by means of a jack 20 which is fixed on the one hand to the jaw 9 and on the other hand to the drive ring 14.

The operation of joining pipe elements by means of the above described device takes place in the following manner:

The end of the pipe system 2, which has already been joined, is fixed to the driving carriage 1 by means of the clamping jaws 9. The intermediate member 4 is also positioned in axial alignment with the end of the pipe element 2 with the ring 14 mounted thereon. One end of the pipe element 3 is also engaged into the driving carriage 1 while a distant end of the pipe element 13 is supported by the carriage 5. While the pipe elements 2 and 3 are locked in fixed position in axial alignment by the jaws 9 and 10, the intermediate member is rotated. The tubular element 3 is displaced in the direction towards the tubular element 2 by means of a force supplied by the ram 11 until the surfaces to be joined are brought into pressure contact one with the other with the intermediate member 4 therebetween. While rotating, the position of the intermediate member is continuously adjusted, as by means of the ram 20, in order to achieve uniform welding conditions on both ends of the member 4. By reason of the frictional engagement between the rotating intermediate member 4 and the frictionally engaged ends of the tubular ends 2 and 3, the temperature rises sufficient to cause softening of the metal. When a bead is formed, indicating that sufficient of the metal has been softened, rotation of the intermediate member is stopped while the pressure is maintained by means of the ram 11 until the weld has set.

The above described operations are directed by means of a control apparatus responsive to data received from: two gauges of the type used for measuring metal flow, which gauges measure the speed of the flow of the metal in the welding zones; two optical pyrometers which measure the temperature of the zones of the weld.

The measuring instruments are connected to a control apparatus by means of a wheatstone bridge wiring system which provides the control apparatus, with the physical data compared in pairs. From these data, the control apparatus continuously determines the position to which the intermediate member 4 should be adjusted in relation to the pipe elements 2 and 3. If necessary, it operates the rams of the piston and cylinder devices 20 and 11, as well as the motor drive for the ring 14.

It will be apparent from the foregoing that the invention described affords many advantages over methods which have previously been employed. It becomes possible rapidly to produce welds of high quality, without the need for highly skilled labor. Since the method is repetitive, the different welds made along the same piece of pipe are identical and, for this reason, there is no need systematically to examine each of the welds.

The method also makes it possible to join pipe elements which are aligned or arranged at an angular relationship one to the other, even on uneven surfaces. It can be used for welding pipes together with other elements, such as collars or valves. Finally, the apparatus is smaller and consumes less energy since only a short, light weight, intermediate member of small energy is adapted to be rotated.

It will be understood that changes may be made in the details of construction, arrangement and operation without departing from the spirit of the invention, especially as defined in the following claims.

I claim:

1. A method for joining two elements of metal or thermoplastic material comprising maintaining the elements substantially immobile relative to each other with the surfaces to be joined facing each other in spaced parallel plane, positioning an intermediate member between the surfaces to be joined, rotating the intermediate member while in pressure contact with the surfaces to be joined until the said surfaces are caused to soften by friction, adjusting the position of the intermediate member in a direction perpendicular to the surfaces to be welded during rotational movement of the intermediate member in response to temperature and flow at the welding zone to provide uniformity in the welds at both ends of the intermediate member, and stopping rotation of the intermediate member while maintaining axial pressure on the parts to be joined until a weld has solidified.

2. A method as claimed in Claim 1 which includes the step of axially displacing at least one of the elements in the direction towards the other to maintain pressure contact between the surfaces.

3. A method as claimed in claim 1 in which the elements to be joined are of tubular shape and wherein the intermediate member is a tubular member of short length.

4. A method as claimed in claim 1 in which the intermediate member is continuously rotated in one direction about the axis of the elements to be joined.

5. A method as claimed in claim 1 in which the intermediate member is rotated in a reciprocal movement about the axis of the elements to be joined.

6. A method as claimed in claim 1 which includes the steps of controlling the position of the intermediate member in response to temperature and flow at the welding zone.

7. A method as claimed in claim 1 in which the elements to be joined and the intermediate member are formed of a material selected from the group consisting of a metal in the form of iron, copper, aluminum and alloys thereof, and a thermoplastic material in the form of a polyethylene and polyvinyl chloride.

8. An apparatus for joining two tubular elements by friction comprising support means for maintaining the ends of the tubular elements in fixed position in parallel spaced relation, means for supporting a short tubular member in alignment between the spaced ends of the tubular elements, means for rotating the short tubular member between the tubular elements to be joined, traction means for moving at least one of the tubular elements in the direction towards the other to effect pressure contact between the end surfaces of the tubular elements and the tubular member during rotational movement to soften the material by frictional engagement, said traction means being effective to maintain axial pressure after the material has been reduced to a softened state and the rotational movement of the tubular member has been stopped to effect joinder, and means for adjusting the position of the tubular member relative to the ends of the tubular elements in response to temperature and flow at the weld zones.

9. An apparatus as claimed in claim 8 in which the tubular member is mounted for continuous movement in one direction.

10. An apparatus as claimed in claim 8 in which the tubular member is mounted for reciprocal movement.

* * * * *